United States Patent
Lee et al.

(10) Patent No.: US 8,504,350 B2
(45) Date of Patent: Aug. 6, 2013

(54) USER-INTERACTIVE AUTOMATIC TRANSLATION DEVICE AND METHOD FOR MOBILE DEVICE

(75) Inventors: Ki Young Lee, Daejeon (KR); Oh Woog Kwon, Daejeon (KR); Sung Kwon Choi, Daejeon (KR); Yoon-Hyung Roh, Daejeon (KR); Chang Hyun Kim, Daejeon (KR); Young-Ae Seo, Daejeon (KR); Seong Il Yang, Daejeon (KR); Yun Jin, Daejeon (KR); Jinxia Huang, Daejeon (KR); Yingshun Wu, Daejeon (KR); Eunjin Park, Daejeon (KR); Young Kil Kim, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 870 days.

(21) Appl. No.: 12/642,557

(22) Filed: Dec. 18, 2009

(65) Prior Publication Data
US 2011/0066421 A1  Mar. 17, 2011

(30) Foreign Application Priority Data
Sep. 11, 2009  (KR) .................... 10-2009-0086064

(51) Int. Cl.
*G06F 17/28*  (2006.01)
(52) U.S. Cl.
USPC ............................................................ 704/2
(58) Field of Classification Search
USPC .................................................... 704/2, 277
See application file for complete search history.

(56) References Cited

U.S. PATENT DOCUMENTS

| 6,330,530 | B1 * | 12/2001 | Horiguchi et al. ................. 704/4 |
| 7,310,605 | B2 * | 12/2007 | Janakiraman et al. ........ 704/277 |
| 8,108,202 | B2 * | 1/2012 | Kwon et al. ...................... 704/2 |
| 2001/0032070 | A1 | 10/2001 | Teicher |
| 2003/0036898 | A1 * | 2/2003 | Duan et al. ....................... 704/2 |
| 2005/0197825 | A1 | 9/2005 | Hagerman et al. |
| 2008/0300859 | A1 | 12/2008 | Chen et al. |
| 2009/0198486 | A1 | 8/2009 | Chang |

FOREIGN PATENT DOCUMENTS

| KR | 1020050054007 A | 6/2005 |
| KR | 1020060093206 A | 8/2006 |
| KR | 10-0700141 B1 | 3/2007 |
| KR | 10-2009-0011712 A | 2/2009 |
| KR | 10-2010-0114190 A | 10/2010 |

\* cited by examiner

*Primary Examiner* — Abul Azad

(57) ABSTRACT

A user-interactive automatic translation device for a mobile device, includes: a camera image controller for converting an image captured by a camera into a digital image; an image character recognition controller for user-interactively selecting a character string region to be translated from the digital image, performing a character recognition function on the selected character string region based on an optical character reader (OCR) function and character recognition information to generate a text string; and user-interactively correcting errors included in the text string. Further, the user-interactive automatic translation device includes a text transmission controller for transmitting the error-corrected text string; and an automatic translation controller for receiving the error-corrected text string from the text transmission controller, performing a morpheme analysis, tagging, a structure analysis, a structure conversion, and a vocabulary conversion on the text string to generate a translation of the text string based on a grammar of a target language.

16 Claims, 7 Drawing Sheets

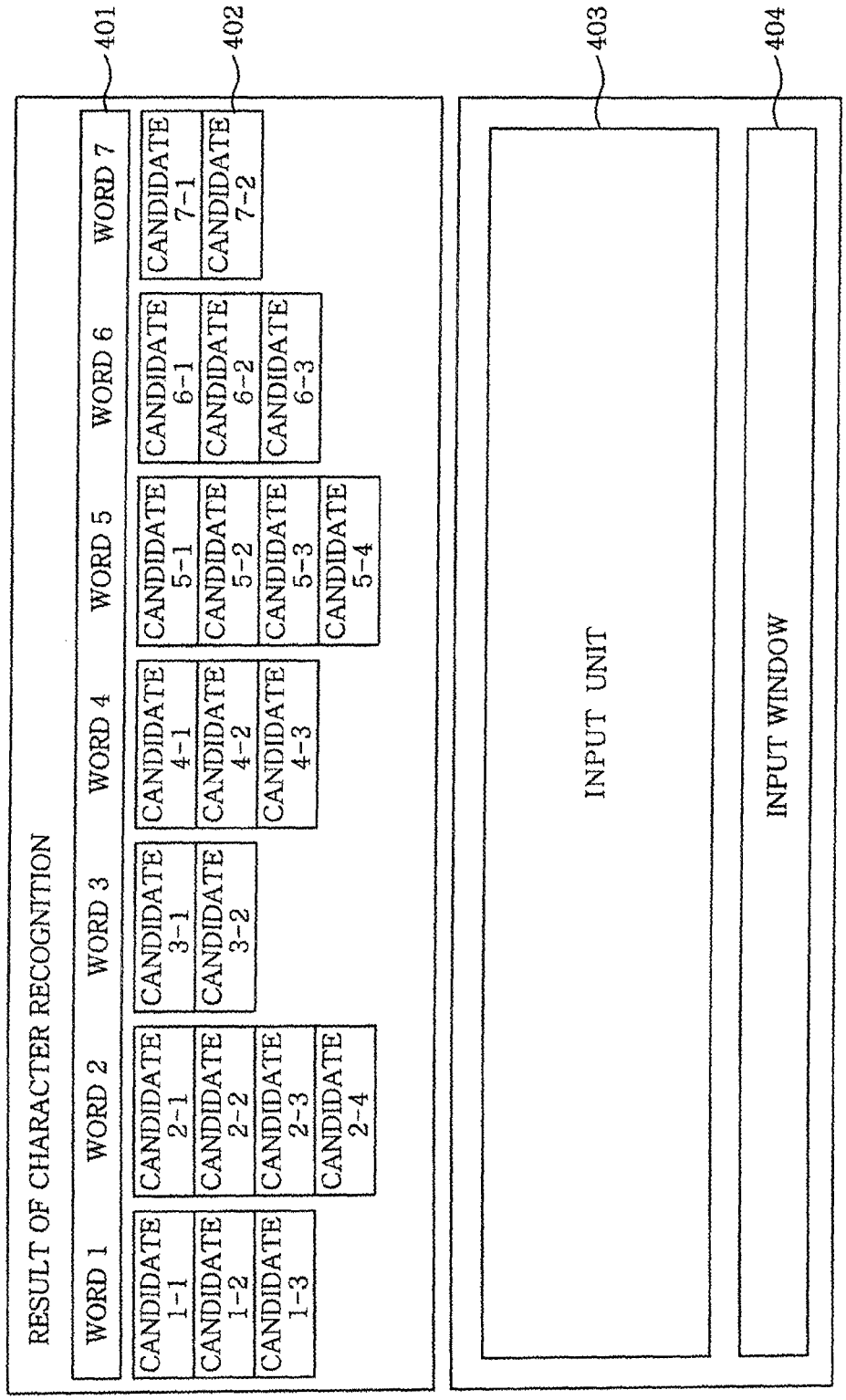

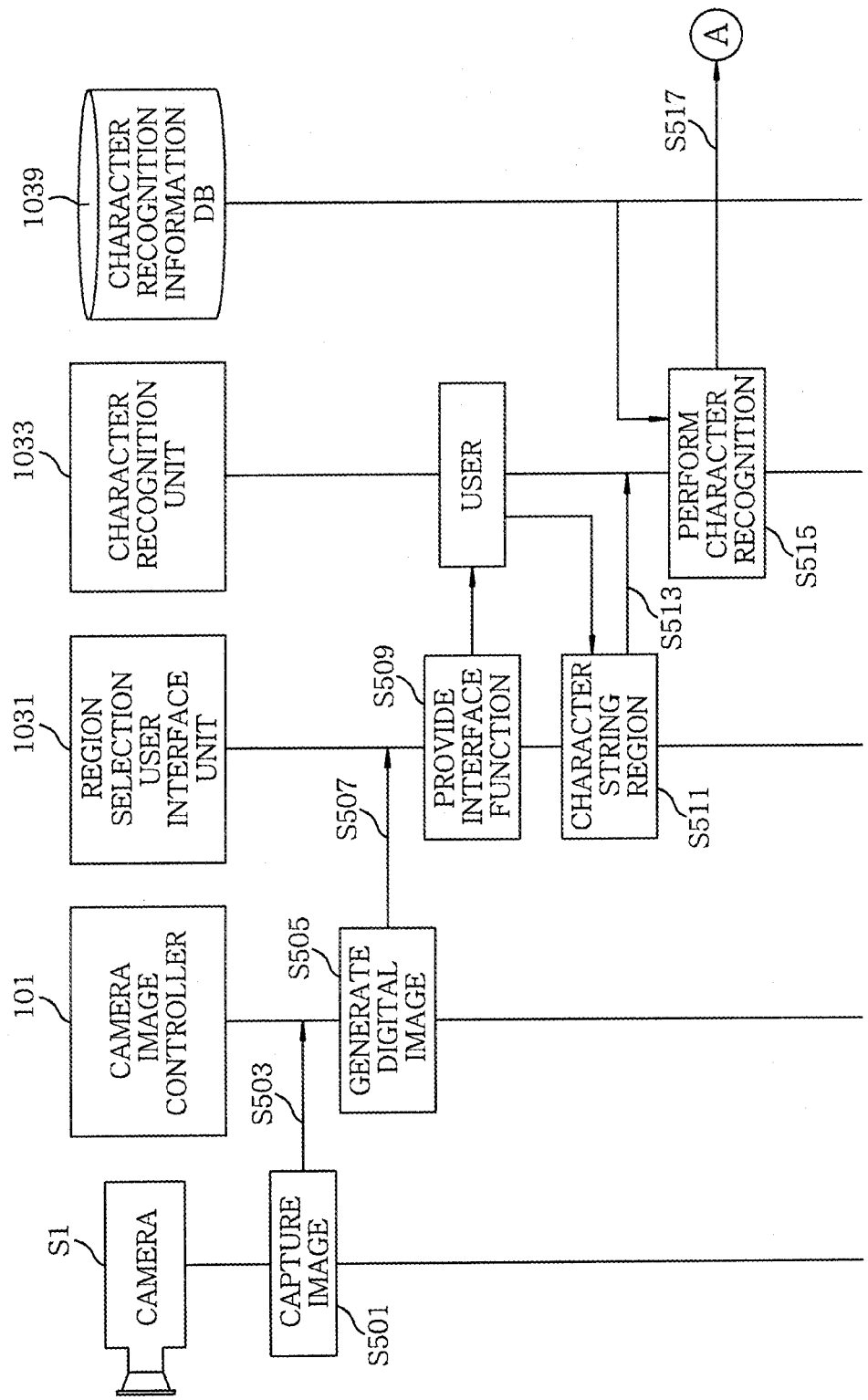

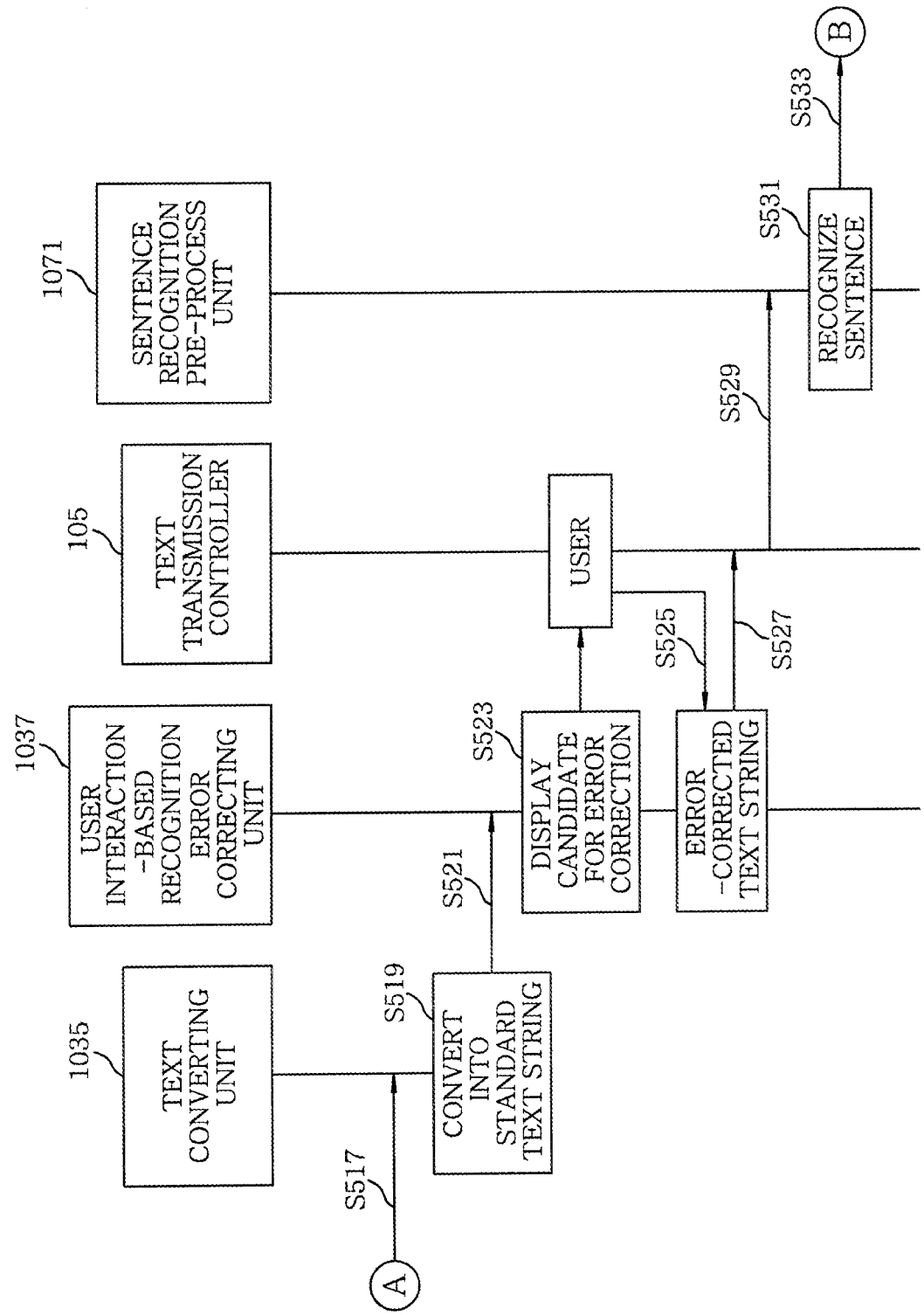

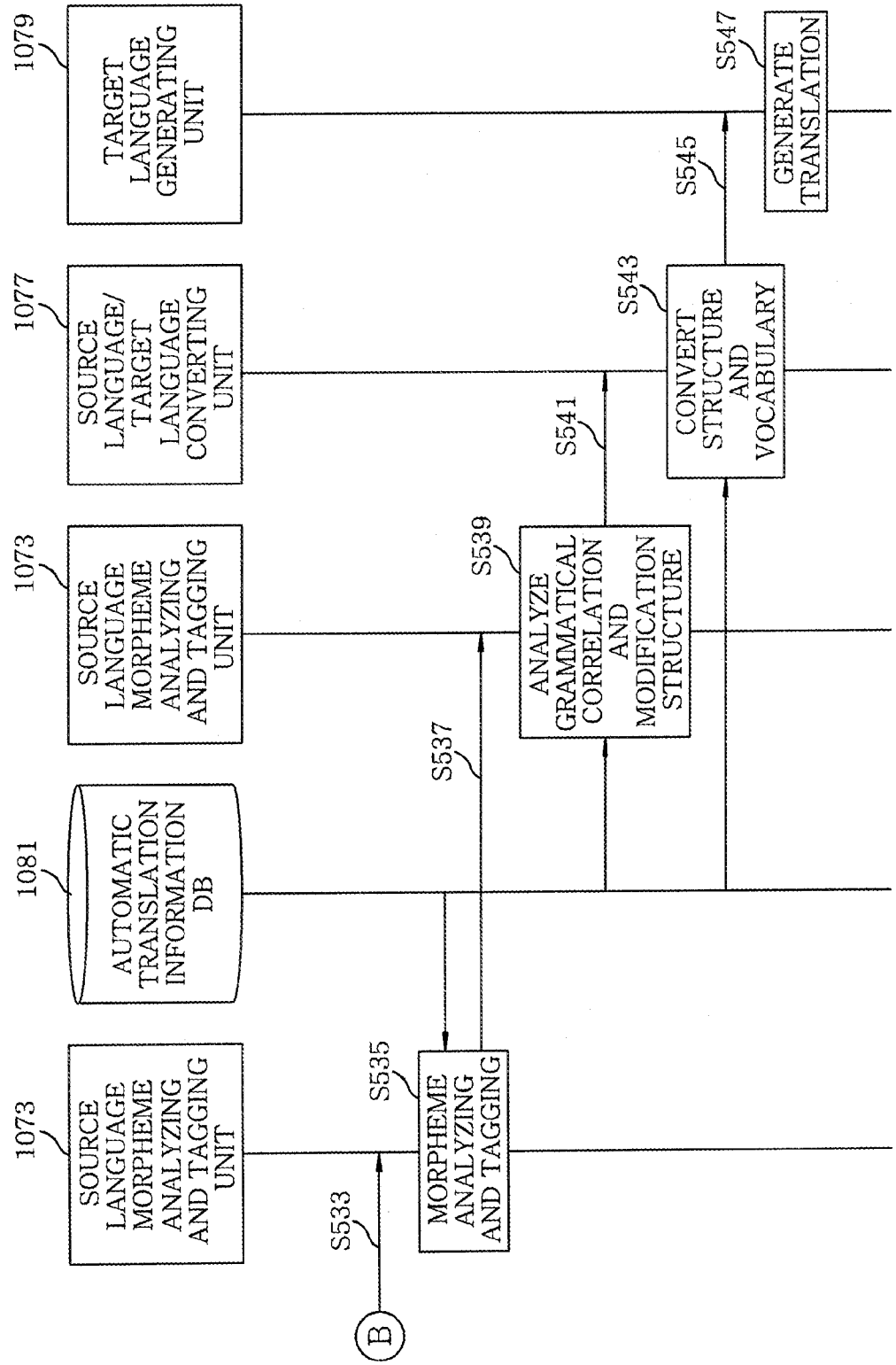

USER-INTERACTIVE AUTOMATIC TRANSLATION DEVICE AND METHOD FOR MOBILE DEVICE

CROSS-REFERENCE TO RELATED APPLICATIONS

The present invention claims priority of Korean Patent Application No. 10-2009-0086064, filed on Sep. 11, 2009, which is incorporated herein by reference.

FIELD OF THE INVENTION

The present invention relates to a user-interactive automatic translation device and method for a mobile device; and more specifically to a user-interactive automatic translation device and method for a mobile device which is capable of achieving a high-quality automated translation of a word or sentence included in an image captured by a camera included in the mobile device, e.g., cellular phone, PDA, PDP and the like with an enhanced translation accuracy by interaction with a user.

BACKGROUND OF THE INVENTION

Performance of an automatic translation device has been gradually improved, however, translation results of the automatic translation device still contains lots of errors or faults. The automatic translation device performing a rule-based or pattern-based translation particularly shows unsatisfactory translation results with unnatural or ungrammatical sentences.

Some of these errors can be solved by improving separate modules included in a translation engine, however, because the separate modules do not consider a sentence as a whole, the errors are still likely to occur. Therefore, a function of automatically correcting errors occurring in a final translation is required to upgrade a performance of an automatic translation device.

Further, most of automatic translation devices are mainly used for desktop computers or servers. These types of automatic translation devices generally perform an automatic translation on already digitalized text files, web documents, PDF files and the like.

However, there exist various types of offline texts required to be translated, e.g., menus for restaurants, sign boards on the street, hard copy documents and the like.

Conventionally, there has been an automatic translation device for a mobile device, which includes a character recognition module to provide an automatic translation function.

However, the conventional automatic translation device has a shortcoming of a poor quality of translation due to a limitation of character recognition technologies.

SUMMARY OF THE INVENTION

In view of the above, the present invention provides a user-interactive automatic translation device and method for a mobile device having a camera. In accordance with the present invention, a character string region to be automatically translated can be selected by a user using the user interface in a still image captured by a mobile device having a camera. Then, the selected character string region is subjected to a character recognition process to be converted into a digital text string. Accordingly, errors occurring in the character recognition process can be directly corrected by the user feedback to generate an error-corrected text string, which is in turn automatically translated.

In accordance with a first aspect of the present invention, there is provided a user-interactive automatic translation device for a mobile device, including: a camera image controller for converting an image captured by a camera into a digital image; an image character recognition controller for user-interactively selecting a character string region to be translated from the digital image, performing a character recognition function on the selected character string region based on an optical character reader (OCR) function and character recognition information stored in a character recognition information DB to generate a text string, and user-interactively correcting errors included in the text string; a text transmission controller for transmitting the error-corrected text string; and an automatic translation controller for receiving the error-corrected text string from the text transmission controller, performing a morpheme analysis, tagging, a structure analysis, a structure conversion, and a vocabulary conversion on the text string to generate a translation of the text string based on a grammar of a target language, wherein the morpheme analysis, the tagging, the structure analysis, the structure conversion, the vocabulary conversion, and the translation generation are performed based on information for translation stored in an automatic translation information DB.

In accordance with a second aspect of the present invention, there is provided a user-interactive automatic translation method for a mobile device, including: capturing an image of an object using a camera; converting the image of the object to a digital image; user-interactively selecting a character string region to be translated from the digital image; performing a character recognition on the selected character string region based on an optical character reader (OCR) and character recognition information stored in a character recognition information DB to generate a text string; user-interactively correcting errors included in the text string; and performing a morpheme analysis, tagging, a structure analysis, a structure conversion, and a vocabulary conversion on the error-corrected text string to generate a translation of the text string based on a grammar of a target language, wherein the morpheme analysis, the tagging, the structure analysis, the structure conversion, the vocabulary conversion and the translation generation are performed based on information for translation stored in an automatic translation information DB.

In accordance with an embodiment of the present invention, a character string region to be automatically translated can be selected by a user using the user interface in a still image captured by a mobile device having a camera. Then, the selected character string region is subjected to a character recognition process to be converted into a digital text string. Errors occurring in the character recognition process can be directly corrected by the user feedback to generate an error-corrected text string, which is in turn automatically translated. Accordingly, it is possible to solve a conventional problem that shows a low quality of automatic translation due to inaccurate character recognition.

Further, it is possible for the user to conveniently perform a high-quality automatic translation of translation objects such as menus of a restaurant, traffic signs, various foreign books, manuals of foreign brand products and the like using a portable mobile device at anywhere nationwide and worldwide. Furthermore, it is possible to achieve a high-quality automatic translation by interacting with the user to minimize character recognition error.

BRIEF DESCRIPTION OF THE DRAWINGS

The objects and features of the present invention will become apparent from the following description of an embodiment, given in conjunction with the accompanying drawing, in which:

FIG. 4 is a view illustrating a character recognition error display window in accordance with the embodiment of the present invention; and FIGS. 5A to 5C are flow charts sequentially illustrating a user-interactive automatic translation method for a mobile device in accordance with the embodiment of the present invention.

DETAILED DESCRIPTION OF THE EMBODIMENTS

Hereinafter, embodiments of the present invention will be described in detail with reference to accompanying drawings which form a part hereof.

Figure 1:
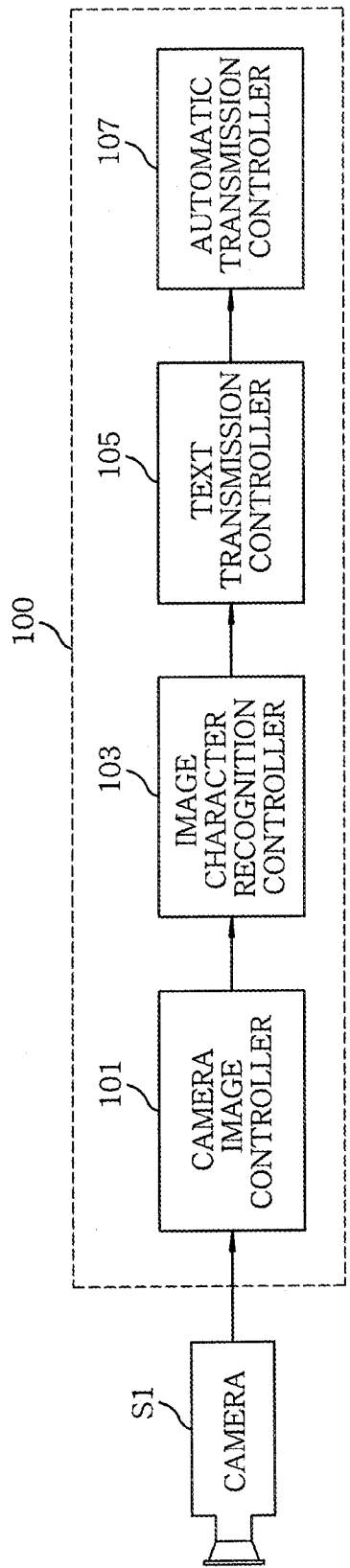
FIG. 1 is a block diagram illustrating a user-interactive automatic translation device for a mobile device in accordance with an embodiment of the present invention.

FIG. 1 is a block diagram illustrating a user-interactive automatic translation device 100 for a mobile device in accordance with an embodiment of the present invention. The user-interactive automatic translation device 100 includes a camera image controller 101, an image character recognition controller 103, a text transmission controller 105 and an automatic translation controller 107.

The camera image controller 101 digitalizes the image of an object, captured by a camera S1, e.g., a camera embedded in the mobile device to generate a digital image, e.g., a digital still image and supplies the digital image to the image character recognition controller 103.

Figure 2:
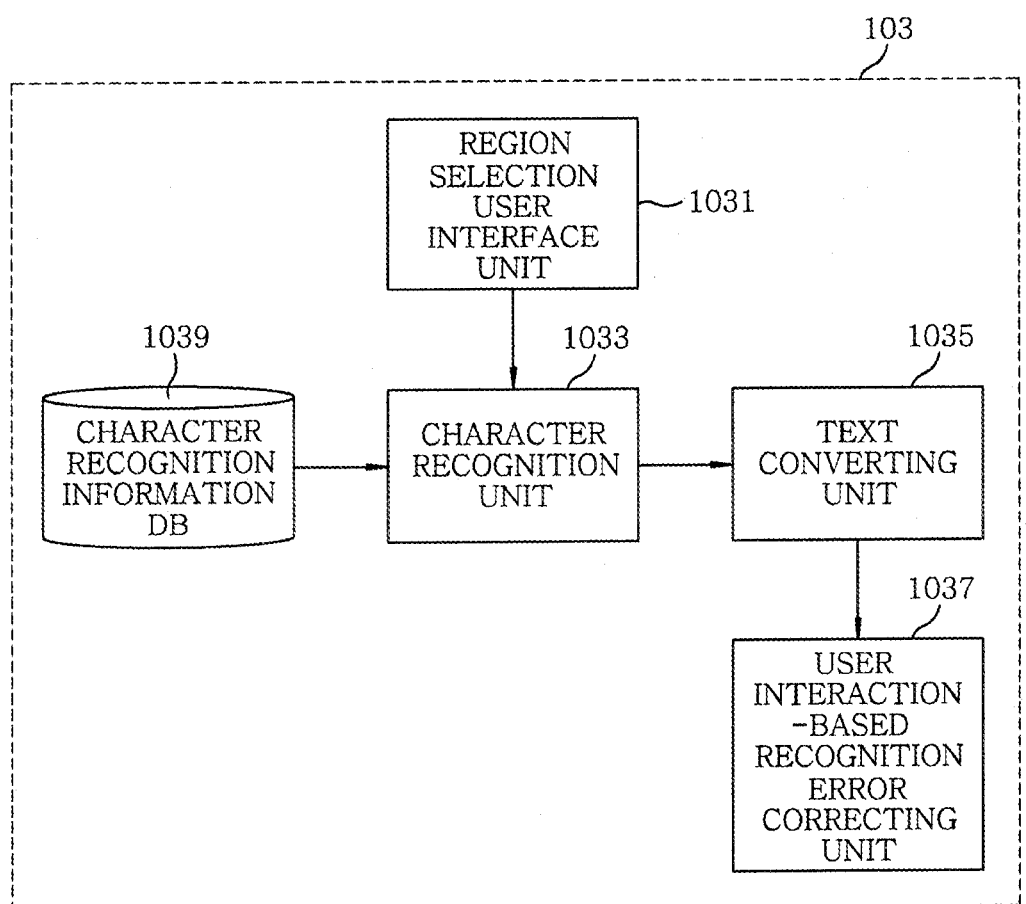
FIG. 2 is a detailed block diagram illustrating the image character recognition controller of FIG. 1.

As shown in FIG. 2, the image character recognition controller 103 includes a region selection user interface unit 1031, a character recognition unit 1033, a text converting unit 1035, a user interaction-based recognition error correcting unit 1037, and a character recognition information database (DB) 1039.

The region selection user interface unit 1031 provides a user with a user interface by which the user can select a character string region to be automatically translated from the digital image supplied from the camera image controller 101. In response to the user selecting the character string region through a rectangular region selection tool, the region selection user interface unit 1031 provides the selected character string region to the character recognition unit 1033.

The character recognition unit 1033 performs a characteristic recognition on the character string supplied from the region selection user interface unit 1031 based on a function of an optical character reader (OCR) and information for character recognition that is stored in the character recognition information DB 1039. Then, the character recognition unit 1033 supplies a resultant character string to the text converting unit 1035.

The text converting unit 1035 converts the character string to a standard text character string based on the American Standard Code for Information Interchange (ASCII), and supplied the standard text string to the user interaction-based recognition error correcting unit 1037.

Here, the ASCII-based standard text string from the text converting unit 1035 may be a standard text string that may be optimally recognized. The user interaction-based recognition error correcting unit 1037 display recognition candidates for each word included in the text string on the user interface (UI) so that the user, by himself, can correct errors that may occur when recognizing the text string. The user can directly correct the errors included in the text string with various input tools, e.g., a digital pen, a key board on the mobile device and the like. The user interaction-based recognition error correcting unit 1037 receives the corrected text string from the user and supplies it to the text transmission controller 105.

The character recognition information DB 1039 stores various types of information preset for character recognition.

The text transmission controller 105 supplies the corrected text string supplied from the user interaction-based recognition error correcting unit 1037 to the automatic translation controller 107.

Figure 3:
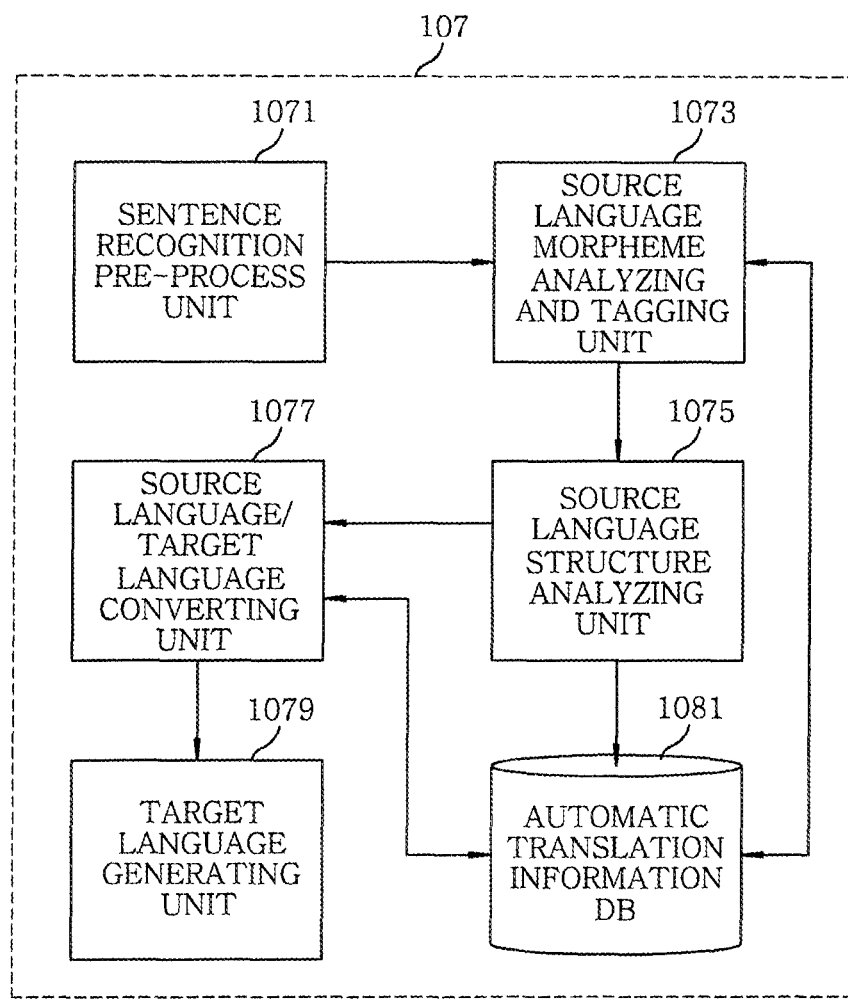
FIG. 3 is a detailed block diagram illustrating the automatic translation controller of FIG. 1.

As shown in FIG. 3, the automatic translation controller 107 includes a sentence recognition pre-process unit 1071, a source language morpheme analyzing and tagging unit 1073, a source language structure analyzing unit 1075, a source language/target language converting unit 1077, a target language generating unit 1079, and an automatic translation information DB 1081.

The sentence recognition pre-process unit 1071 recognizes the corrected text string supplied from the text transmission controller 105 sentence by sentence and supplies the sentence-by-sentence recognized text string to the source language morpheme analyzing and tagging unit 1073. The sentence recognition pre-process unit 1071 can separate sentences not processable by the OCR from the text string.

The source language morpheme analyzing and tagging unit 1073 analyzes source language morphemes of the text string supplied from the sentence recognition pre-process unit 1071 based on a source language morpheme analysis dictionary, a probability dictionary, and a context probability data that are stored in the automatic translation information DB 1081, performs tagging on the result in various methodology such as trigram or hidden markov model (HMM) to restore each of vocabularies included in the text string into original form thereof, applies optimum parts of speech appropriate for the context to the recovered text string to provide the resultant text to the source language structure analyzing unit 1075.

The source language structure analyzing unit 1075 analyzes a grammatical correlation and a modification structure of vocabularies included in each sentence of the text string supplied from the source language morpheme analyzing and tagging unit 1073 based on a structure analysis rule and a translation pattern that are stored in the automatic translation information DB 1081 to provide the resultant text string to the source language/target language converting unit 1077.

The source language/target language converting unit 1077 performs a source language-to-target language conversion on the text string supplied from the source language structure analyzing unit 1075 based on the translation dictionary, the translation pattern, and a translation memory that are stored in the automatic translation information DB 1081. Further, the source language/target language converting unit 1077 converts vocabularies of source language to vocabularies of target language, and supplies the structure-converted and vocabulary-converted text string to the target language generating unit 1079.

The target language generating unit 1079 performs a process, such as an inflection process, on the text string supplied from the source language/target language converting unit 1077 to be appropriate for a grammar for the target language to generate a final translation.

The automatic translation information DB 1081 stores the source language morpheme analysis dictionary, the probability dictionary, the context probability data, the structure analysis rule, the translation pattern, the translation dictionary, the translation pattern, the translation memory and the like.

In accordance with an embodiment of the present invention, a character string region to be automatically translated can be selected by a user using the user interface in a still image captured by a mobile device having a camera. The selected character string region is subjected to a character recognition process to be converted into a digital text string. Then, errors occurring in the character recognition process can be directly corrected by the user feedback to generate an error-corrected text string, which is in turn automatically translated. Accordingly, it is possible to solve a conventional problem that shows a low quality of automatic translation due to inaccurate character recognition.

A user-interactive automatic translation method performed in a mobile device configured as above will now be described in accordance with the embodiment of the present invention.

FIGS. 5A to 5C are flow charts sequentially illustrating a user-interactive automatic translation method performed in the mobile device in accordance with the embodiment of the present invention.

First, an image of an object is captured by the camera S1, e.g., an internal camera included in the mobile device included in the user-interactive automatic translation device 100 (S501).

Then, the camera image controller 101 receives the image of the object from the camera S1 in step S503, generates a digital image in step S505, and supplies the generated digital image, e.g., digital still image to the region selection user interface unit 1031 included in the image character recognition controller 103 in step S507.

The region selection user interface unit 1031 provides a user with a user interface function in step S509 by which the user can select a character string region to be automatically translated from the digital image supplied from the camera image controller 101.

The user uses a rectangular selection tool to select the character string region subjected to an automatic translation process. The region selection user interface unit 1031 receives the character string region selected by the user in step S511 to provide it to the character recognition unit 1033 in step S513.

The character recognition unit 1033 performs a characteristic recognition on the character string supplied from the region selection user interface unit 1031 based on an OCR function and information for character recognition stored in the character recognition information DB 1039 in step S515. Then, the character recognition unit 1033 provides the character-recognized character string to the text converting unit 1035 in step S517.

The text converting unit 1035 converts the character string to an ASCII-based standard text character string in step S519 and supplied the standard text string to the user interaction-based recognition error correcting unit 1037 in step S521.

The text converting unit 1035 may perform a text-conversion process on not only optimum word recognition candidates (i.e., 401 in FIG. 4) in the character string recognized by the character recognition unit 1033 but also recognition candidates (i.e., 402 in FIG. 4) of each of words included in each optimum word recognition candidate.

Here, the ASCII-based standard text string from the text converting unit 1035 may be a standard text string that may be optimally recognized. The user interaction-based recognition error correcting unit 1037 display recognition candidates for each word included in the text string on the UI so that the user, by himself, can correct errors that may occur when recognizing the text string in step S523.

The user may directly correct the errors included in the text string with various input tools, e.g., a digital pen, a key board on the mobile device and the like. The user interaction-based recognition error correcting unit 1037 receives the corrected text string from the user in step S525 and provides the corrected text string to the text transmission controller 105 in step S527.

For example, a process of correcting the errors can be performed by the user on a character recognition error display screen as shown in FIG. 4.

More specifically, as shown in FIG. 4, the optimum word recognition candidates 401 for the ASCII-based standard text string converted by the text converting unit 1035 are displayed on the character recognition error display screen. Further, the recognition candidates 402 for each optimum word recognition candidate 401 are also displayed downward in the order from a high weight value to a low weight value on the character recognition error display screen, wherein each recognition candidate 402 is enclosed in a rectangle. At this time, in the case where, among the optimum word recognition candidates 401, e.g., "word 1" is under a recognition error, the user can touch or click on, e.g., "candidate 1-2", one of the recognition candidates for word 1, to correct the error of character recognition.

The character recognition error display screen provides an input unit 403 (e.g., key pad) and an input window 404 as shown in FIG. 4. Accordingly, in cases where an erroneous word does not belong to the recognition candidates appearing in the character recognition error display screen, the user can enter a word with the input unit 403 while recognizing the entered word through the input window 404, thereby correcting the character recognition error.

The text transmission controller 105 provides the corrected text string supplied from the user interaction-based recognition error correcting unit 1037 to the sentence recognition pre-process unit 1071 included in the automatic translation controller 107 in step S529.

The sentence recognition pre-process unit 1071 recognizes the corrected text string provided from the text transmission controller 105 in step S531 sentence by sentence and provides the sentence-by-sentence recognized text string to the source language morpheme analyzing and tagging unit 1073 in step S533.

The source language morpheme analyzing and tagging unit 1073 analyzes source language morphemes of the text string provided from the sentence recognition pre-process unit 1071 based on a source language morpheme analysis dictionary, a probability dictionary, a context probability data and the like that are stored in the automatic translation information DB 1081, performs tagging on the result in various methodology such as trigram, hidden markov model (HMM) or the like to restore each of vocabularies included in the text string into original form thereof in step S535, applies optimum parts of speech appropriate for the context to the resultant text string, and provides the resultant text to the source language structure analyzing unit 1075 in step S537.

The source language structure analyzing unit 1075 analyzes a grammatical correlation and a modification structure of vocabularies included in each sentence of the text string provided from the source language morpheme analyzing and tagging unit 1073 based on a structure analysis rule and a translation pattern that are stored in the automatic translation information DB 1081 in step S539, and supplies the resultant text string to the source language/target language converting unit 1077 in step S541.

The source language/target language converting unit 1077 performs a source language-to-target language conversion on the text string provided from the source language structure analyzing unit 1075 based on the translation dictionary, the translation pattern, a translation memory and the like that are stored in the automatic translation information DB 1081. Further, the source language/target language converting unit 1077 converts vocabularies of source language to vocabularies of target language in step S543, and provides the resultant text string to the target language generating unit 1079 in step S545.

The target language generating unit 1079 performs a process, such as an inflection process, on the text string supplied from the source language/target language converting unit 1077 to be appropriate for a grammar for the target language to generate a final translation in step S547.

The user-interactive automatic translation method in accordance with the embodiments of the present invention can be implemented as computer-executable codes or programs that are stored in a computer-readable storage medium.

The computer-readable storage medium includes all types of storage devices that store data readable by a computer system.

An example of the computer-readable storage medium includes ROMs, RAMs, CD-ROMs, magnetic tapes, floppy disks, optical data storage and the like. Further, the computer-executable codes or programs can be transmitted over a network including the Internet, and distributably executed in a plurality of computer systems interconnected over a network.

While the invention has been shown and described with respect to the embodiments, it will be understood by those skilled in the art that various changes and modification may be made without departing from the scope of the invention as defined in the following claims.

What is claimed is:

1. A user-interactive automatic translation device for a mobile device, comprising:
   a camera image controller for converting an image captured by a camera into a digital image;
   an image character recognition controller for user-interactively selecting a character string region to be translated from the digital image, performing a character recognition function on the selected character string region based on an optical character reader (OCR) function and character recognition information stored in a character recognition information database (DB) to generate a text string, and user-interactively correcting errors included in the text string;
   a text transmission controller for transmitting the error-corrected text string; and
   an automatic translation controller for receiving the error-corrected text string from the text transmission controller, performing a morpheme analysis, tagging, a structure analysis, a structure conversion, and a vocabulary conversion on the text string to generate a translation of the text string based on a grammar of a target language, wherein the morpheme analysis, the tagging, the structure analysis, the structure conversion, the vocabulary conversion, and the translation generation are performed based on information for translation stored in an automatic translation information DB;
   wherein the image character recognition controller includes:
   a region selection user interface unit for providing a user with an interface so that the user selects the character string region from the digital image, and receiving the character string region selected by the user;
   a character recognition unit for performing a character recognition function on the received character string region based on the OCR function and the character recognition information stored in the character recognition information DB;
   a text converting unit for converting the character-recognized character string into a standard text string; and
   a user interaction-based recognition error correcting unit for displaying the standard text string on a display window and to receive an error-corrected text string through the user interface, and
   wherein the user interaction-based recognition error correcting unit displays optimum word recognition candidates for the standard text string and recognition candidates for each optimum word recognition candidate such that the recognition candidates are displayed downward under the optimum word recognition candidates in the order from a high weight value to a low weight value, each recognition candidate being enclosed in a rectangle, and when one of the recognition candidates associated with an erroneous optimum word recognition candidate is selected through the user interface, the erroneous optimum word recognition candidate is replaced by the selected recognition candidate to correct the error of character recognition.

2. The user-interactive automatic translation device for a mobile device of claim 1, when no recognition candidates associated with the erroneous optimum word recognition candidate exist, the user interaction-based recognition error correcting unit replaces the erroneous optimum word recognition candidate with a word or character entered by a user to correct the error of character recognition.

3. The user-interactive automatic translation device for a mobile device of claim 1, wherein the text converting unit converts the optimum word recognition candidates for the character string and the recognition candidates for the optimum word recognition candidates into a standard text string.

4. The user-interactive automatic translation device for a mobile device of claim 1, wherein the automatic translation controller includes:
   a sentence recognition pre-process for recognizing the text string sentence by sentence;
   a source language morpheme analyzing and tagging unit for analyzing source language morphemes of the sentence-by-sentence recognized text string based on first automatic translation information stored in the automatic translation information DB, performing tagging on the result and restoring each of vocabularies included in the text string into original form thereof to apply parts of speech to the recovered text string;
   a source language structure analyzing unit for analyzing a grammatical correlation and a modification structure of vocabularies included in each sentence of the recovered text string based on second automatic translation information stored in the automatic translation information DB;
   a source language/target language converting unit for performing a source language-to-target language conversion on the analyzed text string based on third automatic translation information stored in the automatic translation information DB to convert vocabularies of source language to vocabularies of target language; and a target language generating unit for applying a grammar of target language to the structure-converted and vocabulary-converted text string to generate a translation.

5. The user-interactive automatic translation device for a mobile device of claim 4, wherein the sentence recognition pre-process unit performs a sentence separation function on the transmitted text string based on the OCR function.

6. The user-interactive automatic translation device for a mobile device of claim 4, wherein the first automatic translation information includes a source language morpheme analysis dictionary, a probability dictionary and a context probability data.

7. The user-interactive automatic translation device for a mobile device of claim 4, wherein the second automatic translation information includes a structure analysis rule and a translation pattern.

8. The user-interactive automatic translation device for a mobile device of claim 4, wherein the third automatic translation information includes a translation dictionary, a translation pattern and a translation memory.

9. A user-interactive automatic translation method for a mobile device, comprising:

capturing an image of an object using a camera;

converting the image of the object to a digital image;

user-interactively selecting a character string region to be translated from the digital image;

performing a character recognition on the selected character string region based on an optical character reader (OCR) and character recognition information stored in a character recognition information DB to generate a text string;

user-interactively correcting errors included in the text string; and performing a morpheme analysis, tagging, a structure analysis, a structure conversion, and a vocabulary conversion on the error-corrected text string to generate a translation of the text string based on a grammar of a target language, wherein the morpheme analysis, the tagging, the structure analysis, the structure conversion, the vocabulary conversion and the translation generation are performed based on information for translation stored in an automatic translation information DB, wherein user-interactively correcting errors includes:

providing a user with a user interface so that the user selects the character string region from the digital image;

performing a character recognition on the selected character string region based on an OCR function and the character recognition information stored in the character recognition information DB;

converting the character-recognized character string into a standard text string;

displaying the standard text string on a display window through the user interface; and correcting the text string through the user interface, and wherein displaying the standard text string includes displaying recognition candidates for an erroneous optimum word recognition candidate to correct the erroneous optimum word recognition candidate such that the recognition candidates are displayed downward under the optimum word recognition candidate in the order from a high weight value to a low weight value, each recognition candidate being enclosed in a rectangle.

10. The user-interactive automatic translation method for a mobile device of claim 9, wherein said correcting includes, when one of the recognition candidates associated with the erroneous optimum word recognition candidate is clicked through the user interface, replacing the erroneous optimum word recognition candidate by the clicked recognition candidate to correct the error of character recognition.

11. The user-interactive automatic translation method for a mobile device of claim 10, wherein said correcting includes, when no recognition candidates associated with the erroneous optimum word recognition candidate exist, replacing the erroneous optimum word recognition candidate with a word or character entered by a user to correct the error of character recognition.

12. The user-interactive automatic translation method for a mobile device of claim 9, wherein said converting the character-recognized character string includes converting the optimum word recognition candidates for the character string and the recognition candidates for the optimum word recognition candidates into a standard text string.

13. The user-interactive automatic translation method for a mobile device of claim 9, wherein said generating the translation includes:

recognizing the error-corrected text string sentence by sentence;

analyzing and tagging source language morphemes of the sentence-by-sentence recognized text string based on first automatic translation information stored in the automatic translation information DB to restore each of vocabularies included in the text string into original form thereof;

analyzing a grammatical correlation and a modification structure of vocabularies included in each sentence of the recovered text string based on second automatic translation information stored in the automatic translation information DB;

performing a source language-to-target language conversion on the analyzed text string based on third automatic translation information stored in the automatic translation information DB to convert vocabularies of source language to vocabularies of target language; and applying a grammar of target language to the structure-converted and vocabulary-converted text string to generate the translation.

14. The user-interactive automatic translation method for a mobile device of claim 13, wherein the first automatic translation information includes a source language morpheme analysis dictionary, a probability dictionary and a context probability data.

15. The user-interactive automatic translation method for a mobile device of claim 13, wherein the second automatic translation information includes a structure analysis rule and a translation pattern.

16. The user-interactive automatic translation method for a mobile device of claim 13, wherein the third automatic translation information includes a translation dictionary, a translation pattern and a translation memory.

* * * * *